(12) United States Patent
Demott et al.

(10) Patent No.: US 10,011,510 B2
(45) Date of Patent: Jul. 3, 2018

(54) MELTER HAVING A SUBMERGED COMBUSTION BURNER, METHOD USING THE BURNER AND USE OF THE BURNER

(71) Applicant: KNAUF INSULATION, Vise (BE)

(72) Inventors: Gerard Demott, Majcichov (SK); Bostjan Marolt, Poljane (SI); Randy Etzkorn, Visé (BE); David Ducarme, Wavre (BE)

(*) Notice: Subject to any disclaimer, the term of this patent is extended or adjusted under 35 U.S.C. 154(b) by 0 days.

(21) Appl. No.: 14/908,357

(22) PCT Filed: Jul. 30, 2014

(86) PCT No.: PCT/EP2014/066442
§ 371 (c)(1),
(2) Date: Jan. 28, 2016

(87) PCT Pub. No.: WO2015/014919
PCT Pub. Date: Feb. 5, 2015

(65) Prior Publication Data
US 2016/0159676 A1 Jun. 9, 2016

(30) Foreign Application Priority Data
Jul. 31, 2013 (GB) .................................. 1313652.8

(51) Int. Cl.
*C03B 3/00* (2006.01)
*C03B 5/235* (2006.01)
(Continued)

(52) U.S. Cl.
CPC .............. *C03B 5/2356* (2013.01); *C03B 5/12* (2013.01); *C03B 5/44* (2013.01); *F23C 3/004* (2013.01);
(Continued)

(58) Field of Classification Search
CPC ... C03B 5/2356; C03B 5/2353; F23D 14/045; F23C 3/004
See application file for complete search history.

(56) References Cited

U.S. PATENT DOCUMENTS

| | | |
|---|---|---|
| 3,248,205 A | 4/1966 | Dolf et al. |
| 3,260,587 A | 7/1966 | Dolf et al. |

(Continued)

FOREIGN PATENT DOCUMENTS

| | | |
|---|---|---|
| DE | 10029983 A1 | 1/2002 |
| EP | 0086858 A1 | 8/1983 |

(Continued)

OTHER PUBLICATIONS

"Energy-efficient glass melting—The next generation melter—Final Report" (82 pages), David Rue, US Gas Technology Institute Project 20621, pp. 26-30, Figures 23-41 and pp. 1-73, Figures 23, 25, 61, 68, and 70—Mar. 1, 2008.

(Continued)

*Primary Examiner* — Gregory A Wilson
(74) *Attorney, Agent, or Firm* — Knauf Insulation, Inc.; James K. Blodgett

(57) ABSTRACT

The claims define a submerged combustion melter comprising a submerged combustion burner (1) comprising three concentric tubes, all being closed at one end and open at the same opposite end, the internal tube (3) being connected to a source of oxygen containing gas (7), the middle tube (9) surrounding the internal tube (3) being connected to a source of fuel gas (11), and the outer tube (15) being connected to a source (19) of oxygen containing gas. The claims are also directed to a method of introducing a flame and/or combustion products into a melt from a submerged combustion burner and also directed to the use of the burner as a submerged combustion burner in a melter.

16 Claims, 2 Drawing Sheets

(51) Int. Cl.
  *C03B 5/12* (2006.01)
  *C03B 5/44* (2006.01)
  *F23C 3/00* (2006.01)
  *F23D 14/20* (2006.01)
  *F23D 14/22* (2006.01)

(52) U.S. Cl.
  CPC ............ *F23D 14/20* (2013.01); *F23D 14/22* (2013.01); *C03B 2211/22* (2013.01); *C03B 2211/23* (2013.01); *C03B 2211/70* (2013.01)

(56) References Cited

U.S. PATENT DOCUMENTS

| | | | |
|---|---|---|---|
| 3,592,151 | A | 7/1971 | Webber |
| 4,544,394 | A | 10/1985 | Hnat |
| 4,622,007 | A | 11/1986 | Gitman |
| 4,632,687 | A | 12/1986 | Kunkle et al. |
| 5,062,789 | A | 11/1991 | Gitman |
| 5,100,453 | A | 3/1992 | Richards |
| 5,104,310 | A * | 4/1992 | Saltin ............ F23C 7/00 431/10 |
| 5,728,190 | A | 3/1998 | Pieper et al. |
| 5,770,535 | A | 6/1998 | Brix et al. |
| 5,954,498 | A | 9/1999 | Joshi et al. |
| 6,109,062 | A | 8/2000 | Richards |
| 6,460,376 | B1 | 10/2002 | Jeanvoine et al. |
| 8,899,224 | B2 * | 12/2014 | Cowles ............ F23C 3/004 126/350.1 |
| 9,150,446 | B2 * | 10/2015 | Douxchamps ............ C03B 5/04 |
| 9,643,871 | B2 * | 5/2017 | Cowles ............ C03B 5/2356 |
| 2002/0162358 | A1 | 11/2002 | Jeanvoine et al. |
| 2005/0039491 | A1 | 2/2005 | Maugendre et al. |
| 2005/0236747 | A1 * | 10/2005 | Rue ............ C03B 5/2356 266/217 |
| 2006/0000239 | A1 | 1/2006 | Jeanvoine et al. |
| 2006/0105899 | A1 | 5/2006 | Jacques et al. |
| 2008/0145804 | A1 | 6/2008 | Palmieri et al. |
| 2008/0184919 | A1 * | 8/2008 | D'Agostini ............ F23C 6/045 110/263 |
| 2008/0256981 | A1 | 10/2008 | Jacques et al. |
| 2008/0276652 | A1 | 11/2008 | Bauer et al. |
| 2009/0176639 | A1 | 7/2009 | Jacques et al. |
| 2011/0236846 | A1 | 9/2011 | Rue et al. |
| 2011/0308280 | A1 | 12/2011 | Huber |
| 2012/0077135 | A1 | 3/2012 | Charbonneau |
| 2013/0086944 | A1 | 4/2013 | Shock et al. |
| 2013/0086949 | A1 | 4/2013 | Charbonneau |
| 2013/0086950 | A1 | 4/2013 | Huber et al. |
| 2013/0086951 | A1 | 4/2013 | Charbonneau et al. |
| 2013/0086952 | A1 | 4/2013 | Charbonneau et al. |
| 2013/0260980 | A1 | 10/2013 | Touslee et al. |
| 2013/0283861 | A1 | 10/2013 | Mobley et al. |
| 2013/0327092 | A1 | 12/2013 | Charbonneau |
| 2014/0007622 | A1 | 1/2014 | Shock et al. |
| 2014/0007623 | A1 | 1/2014 | Charbonneau et al. |
| 2014/0090423 | A1 | 4/2014 | Charbonneau et al. |
| 2014/0144185 | A1 | 5/2014 | Shock et al. |
| 2015/0225274 | A1 | 8/2015 | Solvang et al. |
| 2015/0274578 | A1 | 10/2015 | Solvang et al. |
| 2015/0291465 | A1 * | 10/2015 | Cowles ............ C03B 5/2356 65/134.5 |
| 2016/0060154 | A1 * | 3/2016 | Cowles ............ C03B 5/2356 65/134.5 |
| 2016/0075586 | A1 | 3/2016 | Charbonneau et al. |
| 2016/0083279 | A1 | 3/2016 | Cai et al. |
| 2016/0130168 | A1 * | 5/2016 | Cowles ............ C03B 5/2356 65/346 |
| 2016/0145135 | A1 | 5/2016 | Baker |
| 2016/0159675 | A1 | 6/2016 | DeMott et al. |
| 2016/0159676 | A1 | 6/2016 | DeMott et al. |
| 2016/0168001 | A1 | 6/2016 | DeMott et al. |
| 2016/0185642 | A1 | 6/2016 | DeMott et al. |
| 2016/0207814 | A1 | 7/2016 | DeMott et al. |

FOREIGN PATENT DOCUMENTS

| | | |
|---|---|---|
| EP | 2578548 A2 | 4/2013 |
| FR | 2837916 A1 | 10/2003 |
| JP | 2012096942 A | 5/2012 |
| WO | 8707591 A1 | 12/1987 |

OTHER PUBLICATIONS

"Submerged Combustion Melting of Glass" (14 pages, pp. 262-274), David Rue and John T. Brown, International Journal of Applied Glass Science, vol. 2, No. 4, pp. 270-271, Figure 2—Nov. 9, 2011.

"Submerged Combustion Melter" (9 pages), David Rue, Walter Kunc, and Victor A. Nosovitsky, Institute of Gas Technology (Chicago, IL), Vladimir M. Olabin and Alexander B. Maximuk (Gas Institute, Naval Academy of Sciences (Kiev, Ukraine), American Research Conference, Chicago, IL, Sep. 21-22, 1997.

"Energy-efficient glass melting—The next generation melter" (24 pages), David Rue, Gas Technology Institute, DOE Industrial Technology Program, 2005 Project—Industry Review, Sep. 15, 2005.

Written Opinion of International Searching Authority re PCT/EP2014/066440 (7 pages)—dated Nov. 3, 2014.

Written Opinion of International Searching Authority re PCT/EP2014/066441 (7 pages)—dated Nov. 3, 2014.

Written Opinion of International Searching Authority re PCT/EP2014/066442 (5 pages)—dated Nov. 7, 2014.

Written Opinion of International Searching Authority re PCT/EP2014/066443 (7 pages)—dated Nov. 13, 2014.

Written Opinion of International Searching Authority re PCT/EP2014/066444 (6 pages)—dated Nov. 7, 2014.

Office action for co-pending U.S. Appl. No. 14/908,348 (10 pages)—dated Sep. 12, 2017.

Office action for co-pending U.S. Appl. No. 14/908,767 (14 pages)—dated Nov. 16, 2017.

Office action for co-pending U.S. Appl. No. 14/908,757 (16 pages)—dated Apr. 17, 2017.

Office action for co-pending U.S. Appl. No. 14/908,360 (15 pages)—dated Mar. 23, 2017.

Office action for co-pending U.S. Appl. No. 14/908,757 (21 pages)—dated Jan. 23, 2018.

* cited by examiner

MELTER HAVING A SUBMERGED COMBUSTION BURNER, METHOD USING THE BURNER AND USE OF THE BURNER

CROSS-REFERENCE TO RELATED APPLICATIONS

This application is a U.S. national counterpart application under 35 U.S.C. § 371 of International Application Serial No. PCT/EP2014/066442, filed Jul. 30, 2014, which claims priority to GB Application Serial No. 1313652.8, filed Jul. 31, 2013, the entire disclosures of which are expressly incorporated by reference herein.

TECHNICAL FIELD

The present invention relates to submerged combustion melters, notably for melting vitreous or vitrifiable material, and to processes using a submerged combustion melter.

BACKGROUND

Vitreous materials are generally manufactured from a mixture of raw materials, for example silicates, basalt, limestone, soda ash and other minor constituents which are introduced into a melter and melted into a viscous liquid state at temperatures in the order of 1250 to 1500° C.; the melt is then supplied to a forming process. Depending on the intended use of the melt, for example for manufacture of flat glass, hollow glass, continuous fibers for reinforcement purposes or fibers for insulation purposes, an appropriate further melt refining step may be required upstream of the forming process. The chemical composition of the melt and its physical properties are selected as a function of the intended use and the forming process.

Conventional glass melters comprise an energy supply from above a glass melt surface, for instance from burners generating a flame in a space between the glass melt surface and a crown of the melter, whereby heat is transferred to the glass melt by the flame itself and by radiation from the crown material. Raw batch material to be melted is loaded at the top of the glass melt in the melter and heat is transferred from the melt to the batch material which is incorporated into the melt.

In some glass melters, energy is supplied by electrically heated electrodes arranged below the surface of the melt; such electrodes may provide the only heat source or be used in combination with burners.

Glass melters used to manufacture stone wool insulation have traditionally been cupola furnaces.

In submerged combustion melting raw materials are generally melted by introducing fuel gas and oxygen containing gas through the mass of molten material, causing said fuel gas and oxygen to mix and burn within said mass, melting additional raw material by the heat generated by the burning gas mixture. In an alternative, fuel gas and air and/or oxygen are burned outside the said mass and the hot combustion gases are blown into the glass melt.

Conventional burners used for submerged combustion generally produce a flame that shows a tendency to become unstable, particularly under extreme conditions of agitation in a glass melt. Conventional burners either burn the fuel gas and the oxidant in a combustion chamber and blow the combustion gases into the glass melt, or blow the fuel gas and the oxidant through concentric tubes into the glass melt for combustion therein.

Conventional burners for submerged combustion melting of vitrifiable material generally comprise concentric pipe burners, also called tube-in-tube burners. The inner tube generally is designed for blowing the fuel gas and the outer tube is designed for blowing the oxidant.

SUMMARY

The present invention seeks to provide an improved submerged combustion melter that is capable of generating burner flames that show improved flame stability, particularly under extreme agitation conditions of viscous melts.

DETAILED DESCRIPTION

Figure 1:
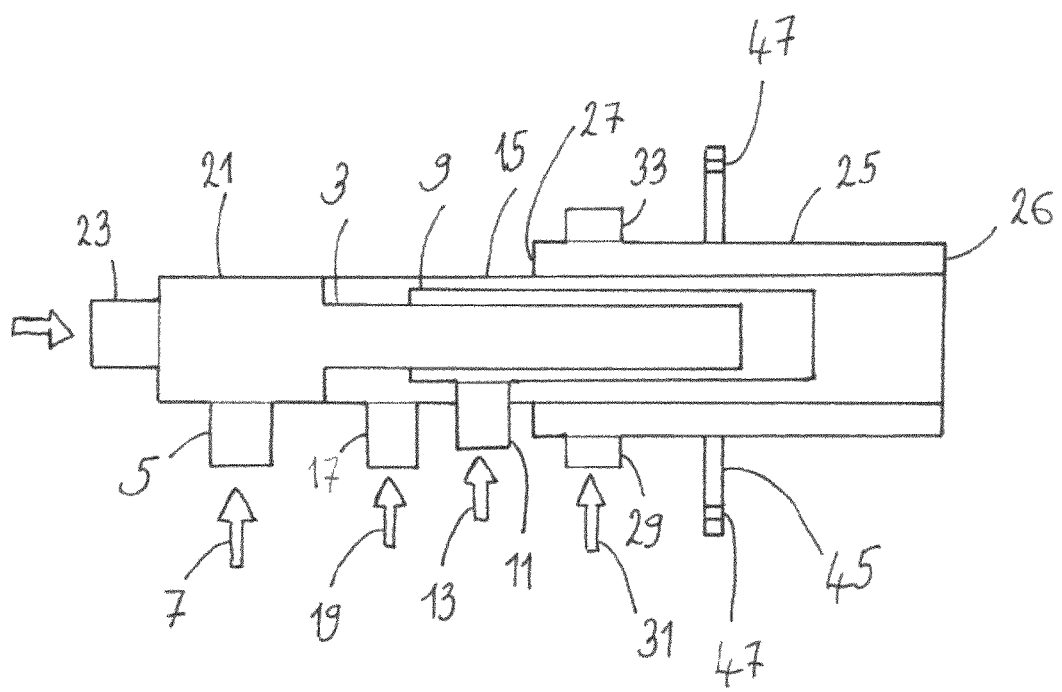
FIG. 1: is a schematic longitudinal cross-section through a burner.

The submerged combustion melter of the invention comprises three concentric tubes, all being closed at or towards one end of the burner and open at the opposite end of the burner, the internal tube being connected to a source of oxygen containing gas, the middle tube surrounding the internal tube being connected to a source of fuel gas, and the outer tube being connected to a source of oxygen containing gas.

The flame generated by the burner is particularly stable, more specifically in extremely agitated conditions of a melt, notably a glass melt. While not being bound by theory, it is believed that this advantage is a result of the fuel gas being substantially enveloped by oxygen containing gas. Oxygen containing gas jets form an envelope around the fuel gas jet on the outside but also on the inside. A well guided stable flame is obtained in an agitated melt. The burners and particularly the stability of the generated flame may be used to provide reduced wear of the furnace and/or a melting process that is more easily controllable.

The burner and/or the melter may be adapted and/or configured to sinter and/or melt raw materials. It may be a "glass melter", that is to say a melter adapted and configured to melt glass-like materials including materials selected from glass, vitreous materials, stone and rock. A glass melter may be used to manufacture flat glass, hollow glass, glass fibers, continuous fibers for reinforcement purposes, mineral fibers for insulation purposes, mineral wool, stone wool or glass wool. The melter may be used to transform raw materials to manufacture frits, cement clinker, notably alumina cement clinker, or abrasives, notably abrasives produced by melting. The melter may be used to transform raw materials, notably by vitrification, for example: vitrification of medical wastes; vitrification of ash, notably from incinerators; vitrification of powders, for example dusts from cast iron or other metal foundries; vitrification of galvanic sludge, tannery sludge or mining industry waste; disposal of waste, notably by vitrification, for example, of polluted soil, soil polluted by heavy metals or tar, clay filters, sludge, activated carbon, radioactive waste, slags containing lead or zinc, refractories, notably refractories containing chromium. Particularly in the case of a glass melter, the raw materials may comprise: silicates, basalt, limestone, soda ash, zeolite catalyst, spent catalyst, spent pot liner, refractory materials, aluminum dross, aluminum melting scum, sand based fire extinguisher waste, sludge, galvanic sludge, clinker, waste materials, ash and combinations thereof.

The melt within the melter during operation may reach a temperature, notable a temperature at which it is removed from the melter, which is at least 1100° C., at least 1200° C. or at least 1250° C. and which may be no more than 1650° C., no more than 1600° C., no more than 1500° C. or no more than 1450° C.

The fuel gas may comprise natural gas; it may comprise propane and/or butane.

According to a preferred embodiment, the burner further comprises a connection to an inert gas source, notably a nitrogen source, preferably a connection to at least the central tube. If burning is interrupted, it may be desired to blow high pressure nitrogen through the burner assembly instead of oxidant and fuel gas in order to prevent material, for example melt, notably liquid glass from entering the burner and solidifying within it.

According to another preferred embodiment, part at least of the burner length may be enveloped by a cooling tube, closed at both ends and comprising an inlet connected to a source of cooling fluid, preferably water, and an outlet connected to a cooling fluid circuit. This arrangement facilitates cooling of the burner when in use.

Preferably, the open end of the outer tube connected to an oxygen containing gas protrudes beyond the open end of the middle tube connected to fuel gas. The open end of the middle tube may protrude beyond the open end of the internal tube connected to a source of oxygen containing gas. The tube containing the cooling fluid preferably extends up to the open end of the outer tube in order to appropriately cool the burner end. Preferably, the principal directions of flow of gasses exiting the burner from each of the outer, middle and internal tubes are co-axial. The principal axis of the flow of gasses exiting the burner is preferably vertical or up to 15° or up to 30° from vertical.

Such burners are particularly suitable for use in submerged combustion melters, for example for the manufacture of glass fibers, mineral wool fibers, glass wool fibers and stone wool fibers. Particularly in such cases, said burners are generally arranged through the bottom of submerged combustion melters and may slightly extend within the liquid glass bath. Suitable cooling of the end extending through the furnace bottom thus protects the burner from excessive wear.

The operating pressure of such a submerged combustion burner, that is the pressure of the gasses generated inside the burner needs to be sufficient for the gasses to overcome the liquid pressure in the melt and thus bubble up through the melt and generate an agitated melt. Advantageously, the pressures are controlled in such a way that melt particles reach a speed of up to 2 m/s. The melt and/or the raw materials within the melter, at least at one portion of the melter and notably at a central melting zone, may reach a speed which is ≥0.1 m/s, ≥0.2 m/s, ≥0.3 m/s or ≥0.5 m/s and/or which is ≤2.5 m/s, ≤2 m/s, ≤1.8 m/s or ≤1.5 m/s.

The speed of the combustion and/or combustible gases, notably at the exit from the burner nozzle(s), may be ≥60 m/s, ≥100 m/s or ≥120 m/s and/or ≤350 m/s, ≤330 m/s, ≤300 or ≤200 m/s. Preferably the speed of the combustion gases is in the range of about 60 to 300 m/s, preferably 100 to 200, more preferably 110 to 160 m/s.

The oxygen containing gas may be air but is preferably oxygen, technical grade oxygen for example gas having an oxygen content of at least 95% by weight or oxygen enriched air. According to a preferred embodiment the oxygen containing gas injected in the internal tube is either air or oxygen enriched air or oxygen, while the oxygen containing gas injected into the outer tube preferably is oxygen.

Preferably, the injected gas keeps the molten mass in a state of agitation, that is a bubbly mass. The heat transmission is thus significant and the stirring of the bath is favorable to the homogeneity of the finished product. The fumes escaping from the bath may be kept under high pressure and may travel through fresh raw material in order to promote heat exchange and preheat said raw material.

The height of a melt pool within the melter, especially when the melting chamber is substantially cylindrical, preferably with an internal diameter of the melting chamber of 1.5 m to −3 m, more preferably 1.75 to 2.5 m, may be: ≥about 0.75 m, ≥about 0.8 m, ≥about 0.85 m or ≥about 0.9 m; and/or
≤about 2.2 m, ≤about 2 m, ≤about 1.8 m, or ≤about 1.6 m.

The submerged combustion melter may have a number of such submerged combustion burners which is ≥1, ≥2, ≥3, ≥4 or ≥5 and/or ≤30, ≤25, ≤20, ≤18, ≤15, ≤12 or ≤10.

The composition of the melt produced by the submerged combustion in the case of a glass melter may comprise one or more of:

|  | Possible melt composition (% weight) | Preferred melt composition (% weight) |
| --- | --- | --- |
| $SiO_2$ | 35-70 | 40-65 |
| $Al_2O_3$ | 5-30 | 15-25 |
| CaO | 5-20 | 5-12 |
| MgO | 0-10 | 1-7 |
| $Na_2O$ | 0-20 | 5-18 |
| K2O | 0-15 | 0-10 |
| $Fe_2O_3$ (total iron) | 0-15 | 0.5-10 |
| $B_2O_3$ | 0-10 | 0-5 |
| $TiO_2$ | 0-5 | 0-2 |
| $P_2O_5$ | 0-3 | 0-2 |
| MnO | 0-3 | 0-2 |
| $Na_2O + K_2O$ (alkali metal oxide) | 5-30 | 5-20 |
| CaO + MgO (alkaline earth metal oxide) | 5-30 | 5-20 |
| Si02 + Al2O3 | 50-85 | 60-80 |

One or more aspects described in the following patent applications, which also relate to submerged combustion melting and/or melters, may be used in respect of the inventions of the present patent application and each of the following patent applications is hereby incorporated by reference:

| Application | Name of applicant | Priority claimed | Our ref |
| --- | --- | --- | --- |
| International PCT patent application PCT/EP2014/066440 filed on 30 Jul. 2014 | Knauf Insulation | GB 1313653.6 | P0524/PCT KMRecup |
| International PCT patent application | Knauf | GB 1313656.9 | P0554/PCT |

| Application | Name of applicant | Priority claimed | Our ref |
| --- | --- | --- | --- |
| PCT/EP2014/066441 filed on 30 Jul. 2014 | Insulation | | KMScrap |
| International PCT patent application | Knauf | GB 1313654.4 | P0543/PCT |
| PCT/EP2014/066443 filed on 30 Jul. 2014 | Insulation | | KMGeo |
| International PCT patent application | Knauf | GB 1313651.0 | P0522/PCT |
| PCT/EP2014/066444 filed on 30 Jul. 2014 | Insulation | | KMMod |

Figure 2:
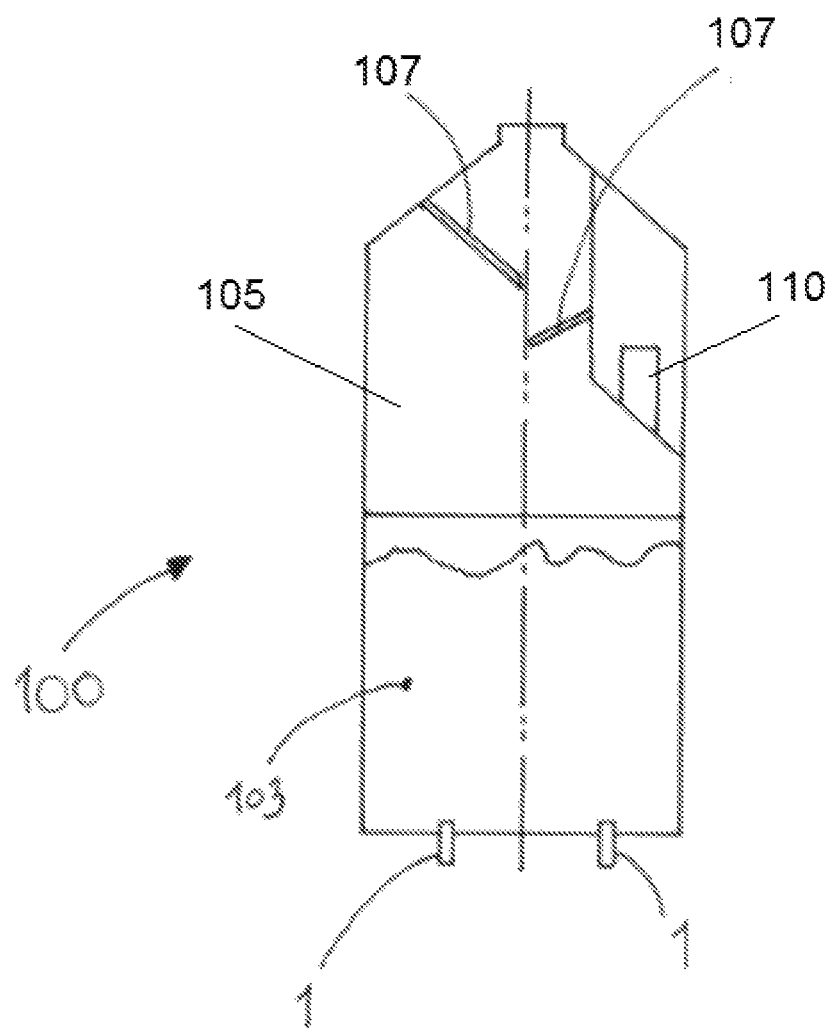
FIG. 2: is a schematic cross section through a submerged combustion glass melting furnace equipped with such burners.

The present invention will be described in more details with reference to the attached drawing of which:

FIG. 1: is a schematic longitudinal cross-section through a burner;

FIG. 2: is a schematic cross section through a submerged combustion glass melting furnace equipped with such burners.

The illustrated submerged combustion burner 1 is particularly suitable for a glass melter and comprises:
- an internal tube 3 connected through internal tube connector 5 to a source of oxygen containing gas 7;
- a middle tube 9, surrounding the internal tube 3, connected through a middle tube connector 11 to a source of fuel gas 13; and;
- an outer tube 15 connected through outer tube connector 17 to a source of oxygen containing gas 19.

The three concentric tubes 3, 9 and 15 are all closed at one end of the burner and open at an opposite nozzle end of the burner. At the closed end 21, the inner tube comprises a connector 23 for connection to a nitrogen source, which may be closed by an appropriate stopper or valve. The nitrogen connection is designed to blow high pressure nitrogen through the burner when firing is interrupted to prevent glass flow into the burner 1.

At least part of the burner length may be enveloped by a further cooling tube 25, closed at both ends 26, 27 and comprising an inlet 29 connected to a source of cooling fluid 31, preferably water, and an outlet 33 connected to a cooling fluid circuit (not shown). This arrangement allows for proper cooling of the burner when in use. The annular space between cooling tube 25 and outer tube 15 may further comprise baffles (not shown) to generate a predesigned liquid flow within that space to optimize the cooling effect on the burner 1.

The open end of the outer tube 15 connected to an oxygen containing gas protrudes beyond the open end of the middle tube 9 connected to fuel gas. The open end of the middle tube 9 protrudes beyond the open end of the internal tube 3 connected to a source of oxygen containing gas. The cooling tube 25 containing the cooling fluid extends up to the open end of the outer tube 15 to cool the burner end.

The tubes 3, 9 and 15 are assembled with each other at the closed end of the burner. It may be advantageous to also connect the relevant tubes to each other at or towards the open end. This may be achieved by assembling centering devices (not shown) located in the space between inner tube 3 and middle tube 9, and between middle tube 9 and outer tube 18. Advantageously at least three such assembling centering devices may be spread over the circumference of the relevant tubes securing the tubes together while leaving sufficient space for the desired gas flow.

Such burners are particularly suitable for use in submerged combustion glass melters. In such cases, said burners or at least their open ends are generally arranged at the bottom of a submerged combustion melter and may slightly extend within the liquid glass bath. Suitable cooling of the end extending into the melt protects the burner from excessive wearing. The burner comprises a flange 45 adapted for securing it into a furnace bottom, for instance by means of screws or other fasteners guided through an appropriate number of flange fastening holes 47 in order to tightly fasten the burner 1 at a furnace bottom.

The submerged burners 1 inject high pressure jets of the combustible gas and oxidant and/or combustion products into the melt sufficient to overcome the liquid pressure and to create forced upward travel of the flame and combustion products. Preferably the velocity of the combustion gases is in the range of about 60 to 300 m/s, preferably 100 to 200, more preferably 110 to 160 m/s. Glass melt particles reach speeds of up to 2 m/s.

Furnace 100 comprises a furnace melting chamber 103 which contains a melt and communicates with an upper chamber 105 and a chimney for evacuation of fumes. The upper chamber 105 is equipped with baffles 107 that block upwards projection of any melt thrown from a surface of the melt by the agitation caused by the burner flames and/or gasses. These hot gases may be used to preheat the raw material and/or the fuel gas and/or oxidant used in the burners. The fumes generally are filtered prior to release to the environment, optionally following dilution with fresh air to reduce their temperature.

The bottom of the furnace melting chamber comprises submerged burners. The melt may be withdrawn from the furnace chamber through a controllable outlet opening (not shown) located in the furnace chamber side wall, close to the furnace bottom essentially opposite a raw material feeder device 110.

The furnace wall advantageously comprises a double steel wall cooled by a cooling fluid, preferably water. Cooling water connections are provided at the external furnace wall. The flow of cooling liquid is preferably sufficient to withdraw energy from the inside wall such that melt can solidify on the internal wall and the cooling liquid, here water, does not boil.

If so desired, the furnace may be mounted on dampers which are designed to absorb vibrational movements.

The melter is particularly advantageous for manufacture of glass fibers, mineral wool, glass wool or stone wool. Its energy efficiency reduces energy consumption and its flexibility allows for easy change of raw material composition. Its ease of maintenance and low capital cost are also advantageous.

The invention claimed is:

1. A submerged combustion melter comprising a submerged combustion burner comprising three substantially concentric tubes, each being closed at one end of the burner and open at an opposite nozzle end of the burner, the internal tube being connected by connecting means to a source of oxygen-containing gas, the middle tube surrounding the internal tube being connected by connecting means to a source of fuel gas, and the outer tube being connected by connecting means to a source of oxygen-containing gas.

2. The submerged combustion melter of claim 1 in which the submerged combustion burner further comprises a connection to a nitrogen source through a connection to the central tube.

3. The submerged combustion melter of claim 1 in which at least part of the burner length is enveloped by a further tube, closed at both ends and comprising an inlet connected to a source of cooling fluid and an outlet connected to a cooling fluid circuit.

4. The submerged combustion melter of claim 3 in which the tube containing the cooling fluid extends up to the open end of the outer tube.

5. The submerged combustion melter of claim 1 in which the open end of the outer tube of the burner connected to an oxygen-containing gas protrudes beyond the open end of the middle tube connected to fuel gas.

6. The submerged combustion melter of claim 1 in which the open end of the middle tube protrudes beyond the open end of the internal tube connected to a source of oxygen-containing gas.

7. The submerged combustion melter of claim 1 in which the burner is adapted for combustion gas velocities in the range of about 60 to 300 m/s.

8. The submerged combustion melter of claim 1 in which the melter comprises at least two submerged combustion burners each comprising three substantially concentric tubes, each being closed at one end of the burner and open at an opposite nozzle end of the burner, the internal tube being connected by connecting means to a source of oxygen-containing gas, the middle tube surrounding the internal tube being connected by connecting means to a source of fuel gas, and the outer tube being connected by connecting means to a source of oxygen-containing gas.

9. The submerged combustion melter of claim 1 in which the burner(s) are arranged at the bottom of the melter.

10. The submerged combustion melter of claim 1 in which the melter is a glass melter.

11. The submerged combustion melter of claim 1 in which the burner is adapted for combustion gas velocities in the range of about 100 to 200 m/s.

12. The submerged combustion melter of claim 1 in which the burner is adapted for combustion gas velocities in the range of about 110 to 160 m/s.

13. A method of introducing a flame and/or combustion products from a submerged combustion burner into a melt comprising:
 projecting a first, central stream of an oxygen-containing gas along an axis;
 projecting a second stream of a hydrocarbon-containing combustible gas along the axis so that it substantially surrounds the central stream of an oxygen-containing gas;
 projecting a third stream of an oxygen-containing gas along the axis so that it substantially surrounds both the central stream of an oxygen-containing gas and the second stream of a hydrocarbon-containing combustible gas; and
 introducing combustion products from combustion of the hydrocarbon-containing combustible gas with the oxygen-containing gas or gasses into a melt of vitrifiable material.

14. The method of claim 13, in which the melt is a glass melt which is formed in to mineral fibers selected from glass fibers, continuous glass fibers, glass wool fibers and stone wool fibers.

15. A burner used as a burner of a submerged combustion burner in a melter, the submerged combustion burner comprising three substantially concentric tubes, each being closed at one end of the burner and open at an opposite nozzle end of the burner, the internal tube being connected by connecting means to a source of oxygen-containing gas, the middle tube surrounding the internal tube being connected by connecting means to a source of fuel gas, and the outer tube being connected by connecting means to a source of oxygen-containing gas.

16. The burner of claim 15, in which the melter is a glass melter producing a glass melt which is formed in to mineral fibers selected from glass fibers, continuous glass fibers, glass wool fibers and stone wool fibers.

* * * * *